May 1, 1945.　　　　E. S. EBERS　　　2,375,089
RUBBER FABRIC MATERIAL
Filed Nov. 8, 1941
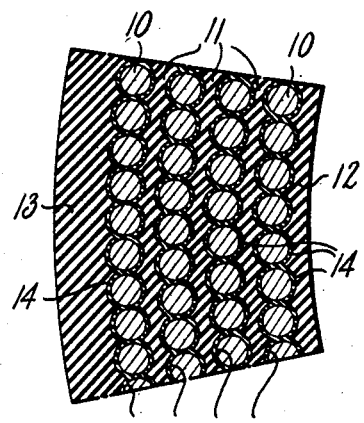
DRIED DEPOSIT OF AN AQUEOUS DISPERSION
OF RUBBER CONTAINING A QUARTENARY
AMMONIUM COMPOUND DEVOID OF
SOAP-LIKE CHARACTERISTICS
INVENTOR.
EARLE S. EBERS
BY
ATTORNEY Patented May 1, 1945

2,375,089

UNITED STATES PATENT OFFICE 2,375,089

RUBBER FABRIC MATERIAL

Earle S. Ebers, Nutley, N. J., assignor to United States Rubber Company, New York, N. Y., a corporation of New Jersey Application November 8, 1941, Serial No. 418,399

14 Claims. (Cl. 154—2)

This invention relates to articles comprising rubber-fabric material, such as cord tires, hose, belts and the like, and to processes for making same. More particularly the invention relates to increasing the resistance to flexing of such rubber-fabric material.

In the manufacture of rubber-fabric material for use in cord tires, belting, and the like, rubber layers are bonded to alternate plies of fabric. In one method of making such rubber-fabric material, the fabric, which may be merely a series of parallel cords, or a series of parallel cords with weak filling threads, or a square woven fabric, is first coated with a thin coating of rubber by passing the fabric through a bath of an aqueous dispersion of rubber, such as rubber latex, or artificial dispersion of rubber, or a mixture of the two, and drying. A so-called skim coating of a vulcanizable rubber compound is then calendered onto the thus treated fabric, and the composite rubber-fabric material thus formed may be plied up or laminated as in the manufacture of tire carcasses, belts and the like, whereupon on heating and vulcanizing, the rubber skim-coats become bonded to the fabric plies. In the case of cotton fabric plies, the dried deposit of the aqueous rubber dispersion will give adequate adhesion of the intermediate rubber layers on vulcanization of the skim-coat compound In addition to having adequate adhesion in articles comprising fabric plies and intermediate rubber layers, however, it is also necessary that the fabric plies resist separation from the rubber layers by virtue of the repeated flexing that occurs in use. It is desirable, therefore, to have the highest possible "flexing resistance" of the rubber-fabric material, or in other words, the maximum resistance to the separation of the fabric plies from the intermediate rubber layers under the conditions of use.

The present invention relates to the manufacture of rubber-fabric materials, and tire casings, beltings, and other articles made from the same, wherein the flexing resistance of the rubber-fabric material is greatly improved, thereby allowing the finished articles to stand up in service a greater length of time before separation of the rubber and fabric components occurs.

According to the present invention there is added to the aqueous dispersion of rubber which is used to coat the fabric before applying the skim coat, a quaternary ammonium compound in which one valence of the nitrogen is satisfied by an anion and the remaining valences are satisfied by hydrocarbon radicals selected from the group consisting of alkyl radicals having less than six carbon atoms, phenalkyl radicals having less than four carbon atoms in the side chain, and the radical —CH=CH—CH=CH—CH= having both terminal carbon atoms thereof attached to the nitrogen atom and forming therewith a pyridine ring. The anion in such compound may be any common anion, such as hydroxide, halide, formate, acetate, or sulphate. Such quaternary ammonium compounds are completely devoid of any soap-like characteristics and are therein distinguished from the quaternary ammonium soaps or "cation-active soaps," which latter contain one or more long chain aliphatic radicals having at least six carbon atoms. In the series of cation-active soaps those having from six to nine carbon atoms in the long chain have only feeble soap-like properties which increase with the length of the chain, the marked soap-like properties appearing only when the chain length reaches ten or more carbon atoms.

Examples of the defined quaternary ammonium compounds used in my invention are benzyl pyridinium chloride, tetra ethyl ammonium chloride, trimethyl benzyl ammonium hydroxide, tetra methyl ammonium hydroxide, tetra methyl ammonium chloride, tetra ethyl ammonium hydroxide, methyl pyridinium chloride, dimethyl dibenzyl ammonium hydroxide, trimethyl benzyl ammonium formate, trimethyl benzyl ammonium chloride, triethyl benzyl ammonium chloride.

The drawing shows an enlarged cross section of a portion of the side wall of a tire embodying the invention in which the fabrics 10 comprising cotton cords are bonded to intermediate rubber plies 11 and the inner and outer rubber portions 12 and 13 respectively of the side wall by the dried deposit 14 of an aqueous dispersion of rubber containing a quaternary ammonium compound as above described.

As will be shown in the examples below, the addition of small amounts of these quaternary ammonium compounds to the latex compounds used for treating cotton fabrics before skim-coating with rubber very materially increases the flexing resistance of the final rubber-fabric material. The "cation-active soaps" are not satisfactory since they destabilize and gel or flocculate the latex. Even when such "cation-active soaps" have been introduced into latex in conjunction with a protective to prevent gellation or flocculation, they have been found not to appreciably change the flexing resistance of the rubber-fabric material; in fact, as will be shown later, they apparently decrease the flexing resistance over the rubber dispersion without the cationic soap. It is known that "cation-active soaps" will precipitate ordinary alkali soaps, such as sodium or ammonium stearate, oleate, etc. in aqueous solution and this property may well account for the destabilizing action of such "cation active soaps" on latex.

A significant improvement in flexing resistance results from the addition to the rubber dispersion of as little as two parts, and in some cases one part, by weight of the quaternary ammonium compound per 100 parts of dispersed rubber according to the present invention. It is not contemplated that over 10 parts of the quaternary ammonium compound per 100 parts of the dispersed rubber will be used. The percentage of dispersed rubber in the usual latex compounds for treating cotton cords for skim-coating is not critical. As high as 50% concentration of rubber could be used, although 15% to 30% concentration of rubber represents more nearly present day practice. Such concentrations of quaternary ammonium compounds in these dispersions is not high enough to produce any mercerization of the cotton.

In order to illustrate the invention, flexing tests were made on a conventional latex composition of treating tire cords, with and without various quaternary ammonium compounds according to the present invention as set forth in the examples below. In these "flexing tests," a fabric which consisted of a plurality of parallel disposed cotton cords similar to those used in the manufacture of cord tires and without weft threads was passed through a bath of the particular rubber dispersion used in the example, the excess dispersion removed by means of a doctor blade, and the cords then wound on a duck liner around drying drums in side by side touching relationship and dried to form a so-called "web fabric." The amount of rubber compound applied to the cords in this way was about 10 to 15 parts by weight of dispersion solids per 100 parts of bare cord. Flexing tests, which are in effect a measure of separation and fatigue resistance, were made on test pads prepared from the various web fabrics as described in detail in an article by Gibbons in Industrial & Engineering Chemistry, Analytical Edition, vol II, page 99, Jan. 15, 1930. In preparing flexing pads for such tests, the web fabric made as described above is skim coated on both sides with the following rubber compound, which is merely illustrative of any conventional skim coating compound as used between fabric plies in building up a tire carcass:

| | Parts by weight |
|---|---|
| Smoked sheet | 100 |
| Zinc oxide | 40 |
| Sulfur | 3.5 |
| Pine tar | 2 |
| Stearic acid | 2 |
| Antioxidant | 1.5 |
| Accelerator (mercaptobenzothiazole) | 0.5 |

The skim coating is applied so that there is an equal thickness on each side of the cords and the total gauge of the skim coated ply is 0.050 inch. Pads of six-ply material are then made up from pieces cut from the skim coated fabric, the cords of each ply running perpendicularly to the adjacent ones. The plied pad is next trimmed to fit a mold 5″ x 8″ in size and is cured for 60 minutes at 274° F. while subjected to a constant pressure of between 250 and 300 lbs. per square inch. During vulcanization the pad contracts so that after being cured it is 0.270″ thick. After the pad has stood for at least 15 hours, two pieces each 1″ x 8″ are cut from the pad and bent over a bicycle hub $\frac{7}{8}$ inch in diameter carrying a load of 100 lbs. By means of a motor, these pads are moved back and forth about the hub, travelling about 2 inches away from the center of the piece each time, so that a complete cycle means a travel of about 8 inches. This flexing operation is continued except for necessary interruptions until a separation of one ply from another occurs. The results of the test are expressed in kilocycles (1000 cycles) of flexing to cause this separation of plies.

*Example I*

Flexing pads were prepared as above from the following latex compound, which is merely illustrative of an aqueous dispersion of rubber for making web fabric:

| | Parts by weight |
|---|---|
| Rubber (as 60% solids concentrated latex) | 100 |
| Sulfur | 2.5 |
| Zinc oxide | 2.5 |
| Dimethylamine | .5 |
| Dimethylamine oleate | .5 |
| Accelerator (mercaptobenzothiazole) | .5 |
| Antioxidant | 1.0 |

Water to give total solids of 30%.

The flexing life of these pads was about 50 kilocycles. This corresponds to the flexing life of test pads made from commercial runs of web fabric.

Similar flexing pads were prepared but with the addition to the above latex compound of 3 parts of trimethyl benzyl ammonium hydroxide per 100 parts of rubber solids. Under the same conditions for testing, these pads were found to give an average flexing life of about 140 kilocycles, a very great improvement in flexing resistance.

*Example II*

Flexing pads prepared from the latex compound of Example I to which had been added 4 parts by weight of dimethyl dibenzyl ammonium hydroxide per 100 parts of rubber solids of the latex composition showed a flexing life of around 210 kilocycles.

*Example III*

Flexing pads prepared from the latex compound of Example I to which had been added 4.1 parts of triethyl benzyl ammonium chloride per 100 parts of rubber solids of the latex composition showed an average flexing life of around 125 kilocycles.

*Example IV*

Flexing pads prepared from the latex compound of Example I to which had been added 2 parts of tetraethyl ammonium hydroxide per 100 parts of rubber solids of the latex composition showed a flexing life of about 350 kilocycles.

*Example V*

Flexing pads prepared from the latex compound of Example I to which had been added 3 parts of tetramethyl ammonium hydroxide by weight per 100 parts of rubber solids of the latex composition showed a flexing life of around 300 kilocycles.

*Example VI*

Flexing pads prepared from the latex compound of Example I to which had been added 3 parts of tetramethyl ammonium chloride by weight per 100 parts of rubber solids of the latex composition were found to give a flexing life of around 250 kilocycles.

Example VII

Flexing pads prepared from the latex compound of Example I to which had been added 8 parts of methylpyridinium chloride by weight per 100 parts of rubber solids of the latex composition gave a flexing life of about 250 kilocycles.

Example VIII

This example shows that the effect of quaternary ammonium compounds in the rubber dispersion is additive with respect to other flex-improving treatments. It is known that the flexing life may be increased by the addition to the rubber dispersion treating bath of a reactive resorcinol-amine-formaldehyde resin. That such improved latex treating baths are further improved by the addition of a quaternary ammonium salt, according to the present invention, may be seen from the following: Flexing pads were made with the latex compound of Example I to which had been added per 100 parts of rubber in the latex a water-soluble dimethyl-amine-formaldehyde-resorcinol resin made by reacting 1.75 parts of dimethylamine with 2 parts of formaldehyde and 2.5 parts of resorcinol. The flexing life of test pads made with this compound showed a flexing life of about 250 kilocycles. The addition to the latex compound containing the resorcinol-amine-formaldehyde resin of 3 parts by weight of trimethyl benzyl ammonium hydroxide per 100 parts of rubber further increased the flexing life of test pads to around 750 kilocycles.

Quaternary ammonium soaps do not improve the flexing life when tested in the manner of the above examples. For example, the addition to the latex of Example I of two to eight parts of dimethyl lauryl benzyl ammonium bromide per 100 parts of rubber of the latex showed no improvement in the flexing life, the various test pads separating at about 35 to 40 kilocycles. With the addition of such cation active soaps to the latex, it is necessary to add a protective in order to be able to use the composition at all. In this specific test there was added "Emulphor-O," a stabilizer which is believed to be the condensation product of tetraethylene glycol with oleyl alcohol. It was found in the case of dimethyl cetyl benzyl ammonium chloride, another cation active soap, that it could not be added to latex even in the presence of an additional stabilizer to give a sufficiently stable compound for satisfactorily coating the cords.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An article having plies of fabric comprising cotton and vulcanized rubber intermediate the fabric plies, and the dried deposit of an aqueous dispersion of rubber containing a quaternary ammonium compound in which one valence of the nitrogen is satisfied by an anion and all the remaining valences are satisfied by hydrocarbon radicals selected from the group consisting of methyl, ethyl, benzyl, and the radical —CH=CH—CH=CH—CH= having both terminal carbon atoms thereof attached to the nitrogen atom and forming therewith a pyridine ring, bonding the said vulcanized rubber to the said plies.

2. An article having plies of fabric comprising cotton and vulcanized rubber intermediate the fabric plies, and the dried deposit of an aqueous dispersion of rubber containing benzyl pyridinium chloride, bonding the said vulcanized rubber to the said plies.

3. An article having plies of fabric comprising cotton and vulcanized rubber intermediate the fabric plies, and the dried deposit of an aqueous dispersion of rubber containing tetraethyl ammonium chloride, bonding the said vulcanized rubber to the said plies.

4. An article having plies of fabric comprising cotton and vulcanized rubber intermediate the fabric plies, and the dried deposit of an aqueous dispersion of rubber containing trimethyl benzyl ammonium hydroxide, bonding the said vulcanized rubber to the said plies.

5. A pneumatic tire casing having plies of fabric containing cords comprising cotton and vulcanized rubber intermediate the fabric plies, and the dried deposit of an aqueous dispersion of rubber containing a quaternary ammonium compound in which one valence of the nitrogen is satisfied by an anion and all the remaining valences are satisfied by hydrocarbon radicals selected from the group consisting of methyl, ethyl, benzyl, and the radical —CH=CH—CH=CH—CH= having both terminal carbon atoms thereof attached to the nitrogen atom and forming therewith a pyridine ring, bonding the said vulcanized rubber to the said plies.

6. A pneumatic tire casing having plies of fabric containing cords comprising cotton and vulcanized rubber intermediate the fabric plies, and the dried deposit of an aqueous dispersion of rubber containing benzyl pyridinium chloride, bonding the said vulcanized rubber to the said plies.

7. A pneumatic tire casing having plies of fabric containing cords comprising cotton and vulcanized rubber intermediate the fabric plies, and the dried deposit of an aqueous dispersion of rubber containing tetraethyl ammonium chloride, bonding the said vulcanized rubber to the said plies.

8. A pneumatic tire casing having plies of fabric containing cords comprising cotton and vulcanized rubber intermediate the fabric plies, and the dried deposit of an aqueous dispersion of rubber containing trimethyl benzyl ammonium hydroxide, bonding the said vulcanized rubber to the said plies.

9. An article having plies of fabric comprising cotton and vulcanized rubber intermediate the fabric plies, and the dried deposit of an aqueous dispersion of rubber containing 2 to 10 per 100 parts by weight of rubber of a quaternary ammonium compound in which one valence of the nitrogen is satisfied by an anion and all the remaining valences are satisfied by hydrocarbon radicals selected from the group consisting of methyl, ethyl, benzyl, and the radical —CH=CH—CH=CH—CH= having both terminal carbon atoms thereof attached to the nitrogen atom and forming therewith a pyridine ring, bonding the said vulcanized rubber to the said plies.

10. A pneumatic tire casing having plies of fabric containing cords comprising cotton and vulcanized rubber intermediate the fabric plies, and the dried deposit of an aqueous dispersion of rubber containing 2 to 10 parts per 100 parts by weight of rubber of a quaternary ammonium compound in which one valence of the nitrogen is satisfied by an anion and all the remaining valences are satisfied by hydrocarbon radicals selected from the group consisting of methyl, ethyl, benzyl, and the radical

—CH=CH—CH=CH—CH= having both terminal carbon atoms thereof attached to the nitrogen atom and forming therewith a pyridine ring, bonding the said vulcanized rubber to the said plies.

11. A pneumatic tire casing having plies of fabric containing cords comprising cotton and vulcanized rubber intermediate the fabric plies, and the dried deposit of an aqueous dispersion of rubber containing 2 to 10 parts per 100 parts by weight of rubber of benzyl pyridinium chloride, bonding the said vulcanized rubber to the said plies.

12. A pneumatic tire casing having plies of fabric containing cords comprising cotton and vulcanized rubber intermediate the fabric plies, and the dried deposit of an aqueous dispersion of rubber containing 2 to 10 parts per 100 parts by weight of rubber of tetraethyl ammonium chloride, bonding the said vulcanized rubber to the said plies.

13. A pneumatic tire casing having plies of fabric containing cords comprising cotton and vulcanized rubber intermediate the fabric plies, and the dried deposit of an aqueous dispersion of rubber containing 2 to 10 parts per 100 parts by weight of rubber of trimethyl benzyl ammonium hydroxide, bonding the said vulcanized rubber to the said plies.

14. A process for bonding rubber to plies of fabric containing cotton which comprises applying to the fabric a coating from an aqueous dispersion of rubber containing a quaternary ammonium compound in which one valence of the nitrogen is satisfied by an anion and all the remaining valences are satisfied by hydrocarbon radicals selected from the group consisting of methyl, ethyl, benzyl, and the radical

—CH=CH—CH=CH—CH= having both termianl carbon atoms thereof attached to the nitrogen atom and forming therewith a pyridine ring, applying a vulcanizable rubber composition to the thus coated fabric, and vulcanizing the composite product.

EARLE S. EBERS.